US012596021B2

(12) United States Patent
Ellgas et al.

(10) Patent No.: US 12,596,021 B2
(45) Date of Patent: Apr. 7, 2026

(54) INTEGRATED COOLING SOLUTION FOR SPINNING SENSORS

(71) Applicant: Waymo LLC, Mountain View, CA (US)

(72) Inventors: Simon Ellgas, San Jose, CA (US); Justin Matthew Andrade, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/626,577

(22) Filed: Apr. 4, 2024

(65) Prior Publication Data

US 2024/0271973 A1     Aug. 15, 2024

Related U.S. Application Data

(60) Continuation of application No. 17/949,606, filed on Sep. 21, 2022, now Pat. No. 11,976,944, which is a division of application No. 16/221,940, filed on Dec. 17, 2018, now Pat. No. 11,480,451.

(51) Int. Cl.
G01D 11/24     (2006.01)
G01S 7/481     (2006.01)

(52) U.S. Cl.
CPC .......... G01D 11/245 (2013.01); G01S 7/4813 (2013.01)

(58) Field of Classification Search
CPC ...... G01D 11/245; G01D 21/00; G01D 11/24; G01S 7/4813
USPC ........................................................ 165/80.2
See application file for complete search history.

(56) References Cited

U.S. PATENT DOCUMENTS

| | | | |
|---|---|---|---|
| 5,231,401 A | 7/1993 | Kaman et al. | |
| 6,034,451 A | 3/2000 | El | |
| 9,885,526 B2 | 2/2018 | Maranville et al. | |
| 11,156,485 B1 | 10/2021 | Krishnan et al. | |
| 11,480,451 B2 * | 10/2022 | Ellgas | G01D 11/24 |
| 2002/0105786 A1 | 8/2002 | Della et al. | |
| 2009/0185592 A1 | 7/2009 | Vetrovec | |

(Continued)

FOREIGN PATENT DOCUMENTS

| | | |
|---|---|---|
| DE | 102018115896 A1 | 1/2019 |
| JP | H05283879 A | 10/1993 |

(Continued)

OTHER PUBLICATIONS

Decision to Grant for Japanese Patent Application No. 2021-531841, Feb. 6, 2023.

(Continued)

*Primary Examiner* — Steven B Mcallister
*Assistant Examiner* — Charles R Brawner
(74) *Attorney, Agent, or Firm* — Botos Churchill IP Law

(57)     ABSTRACT

This technology relates to a system for cooling sensor components. The cooling system may include a sensor which has a sensor housing, a motor, a main vent, and a side vent. Internal sensor components may be positioned within the sensor housing. The motor may be configured to rotate the sensor housing around an axis. The rotation of the sensor housing may pull air into an interior portion of the sensor housing through the main vent, and the air pulled into the interior portion of the sensor housing may be exhausted out of the interior portion of the sensor housing through the side vent.

20 Claims, 10 Drawing Sheets

(56)          References Cited

U.S. PATENT DOCUMENTS

| | | | |
|---|---|---|---|
| 2012/0162428 A1* | 6/2012 | Wee .......................... B60S 1/56 | |
| | | | 348/148 |
| 2012/0198943 A1 | 8/2012 | Saito et al. | |
| 2015/0293224 A1 | 10/2015 | Eldada et al. | |
| 2016/0041452 A1 | 2/2016 | Nomura et al. | |
| 2017/0305360 A1 | 10/2017 | Zajac | |
| 2018/0334109 A1 | 11/2018 | Trebouet et al. | |
| 2019/0008345 A1 | 1/2019 | Schmidt et al. | |
| 2020/0088480 A1* | 3/2020 | Hu .......................... F28F 13/12 | |
| 2020/0149933 A1* | 5/2020 | Robertson, Jr. .... G02B 27/0006 | |
| 2020/0191918 A1 | 6/2020 | Ellgas et al. | |
| 2022/0196801 A1 | 6/2022 | Robertson et al. | |
| 2022/0357426 A1 | 11/2022 | Krishnan et al. | |

FOREIGN PATENT DOCUMENTS

| | | | |
|---|---|---|---|
| JP | 2001007581 A | 1/2001 | |
| JP | 2001078066 A | 3/2001 | |
| JP | 2001284864 A | 10/2001 | |
| JP | 2010277789 A | 12/2010 | |
| KR | 20160090671 A | 8/2016 | |
| WO | 2011091060 A1 | 7/2011 | |

OTHER PUBLICATIONS

International Search Report and Written Opinion for Application No. PCT/US2019/065160 dated Mar. 27, 2020.
Office Action for Japanese Patent Application No. 2021-531841, mailed Jul. 19, 2022, (including English Translation), 14 pages.
The Extended European Search Report for European Patent Application No. 19900062.1, Jul. 6, 2022.
Notice of Allowance for European Patent Application No. 19900062.1, Apr. 30, 2024, 32 Pages.
Notice of Allowance for Chinese Patent Application No. 201980088715.8, May 1, 2024, 7 Pages.

* cited by examiner

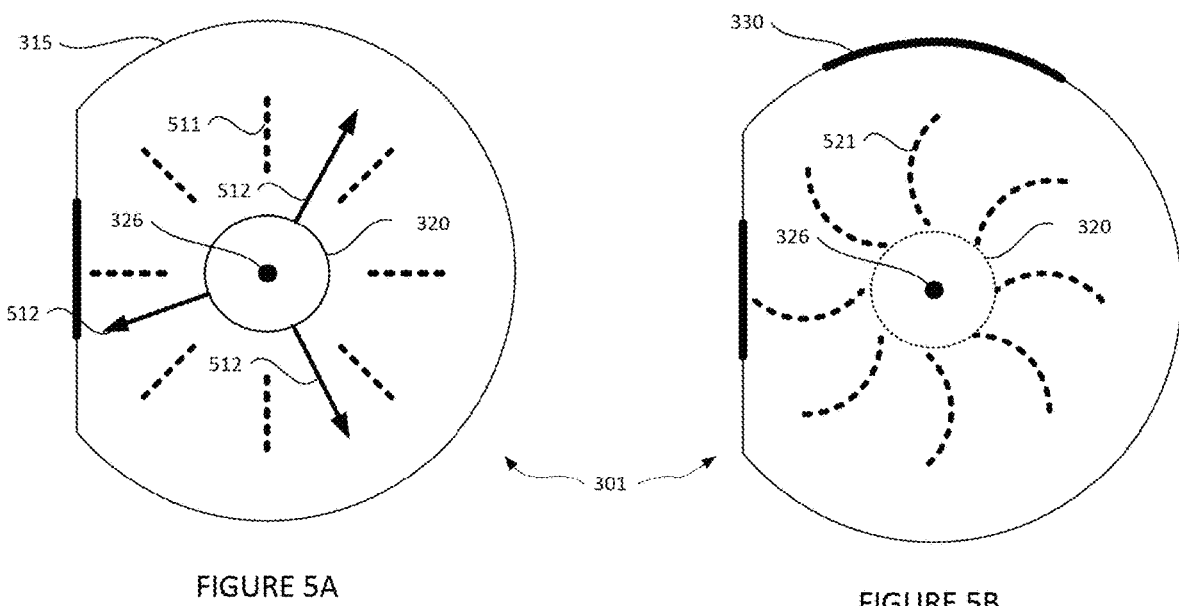
FIGURE 5A                                    FIGURE 5B

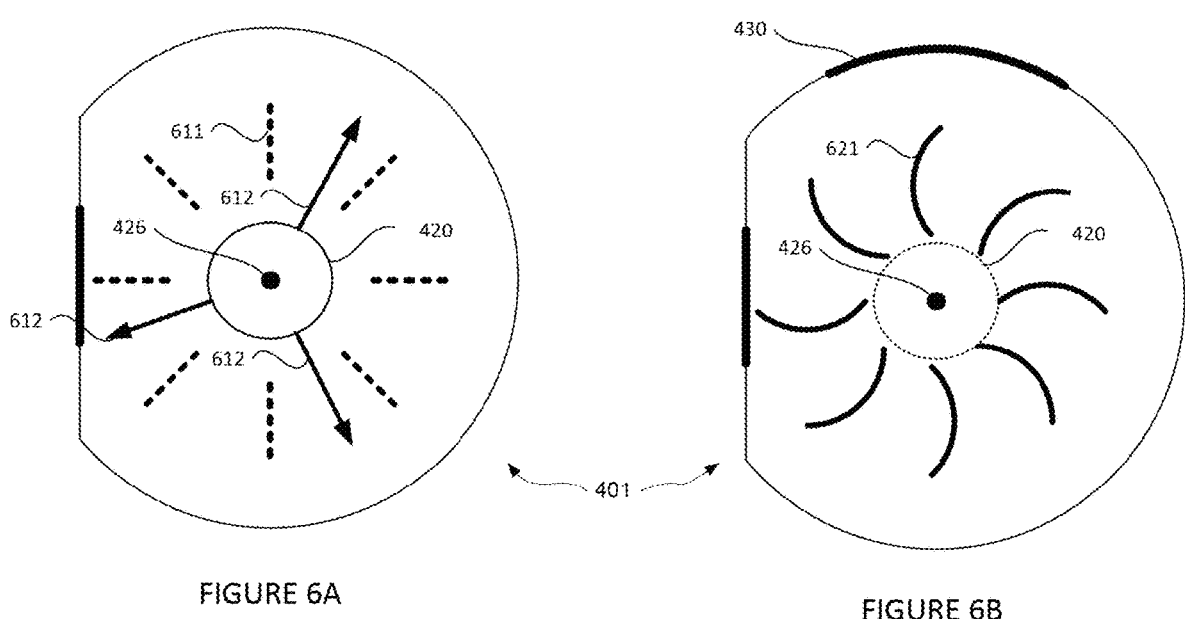
FIGURE 6A                                        FIGURE 6B

INTEGRATED COOLING SOLUTION FOR SPINNING SENSORS

CROSS REFERENCE TO RELATED APPLICATIONS

This application is a continuation of U.S. application Ser. No. 17/949,606, filed Sep. 21, 2022, which is a divisional of U.S. application Ser. No. 16/221,940, filed Dec. 17, 2018, issued as U.S. Pat. No. 11,480,451, the entire disclosures of which are incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location without the need for additional input from the passenger or any other human. Thus, such vehicles may be used to provide transportation services.

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include sensors such as LIDAR, radar, sonar, camera, or other such imaging sensors that scan and record data from the vehicle's environment. Sensor data from one or more of these sensors may be used to detect objects and their respective characteristics (position, shape, heading, speed, etc.).

Operation of these sensors may be adversely affected by the buildup of heat within the sensor itself. Typically, the sensors include a housing to protect the internal sensor components of the sensors from debris and contaminants, but over time, the housing may trap solar heat, as well as heat generated by the various internal components of the sensor. As such, the sensor components may be subjected to sub-optimal temperature conditions during operation.

BRIEF SUMMARY

Various aspects of the disclosure may be directed to cooling sensor components. Some aspects may include a system for cooling sensor components, the system comprising: a sensor having a sensor housing and internal sensor components positioned within the sensor housing; a motor, wherein the motor is configured to rotate the sensor housing around an axis; a main vent; and a side vent, wherein the rotation of the sensor housing pulls air into an interior portion of the sensor housing through the main vent, and wherein the air pulled into the interior portion of the sensor housing is exhausted out of the sensor housing through the side vent.

In some instances, the main vent may be positioned on a top portion of the sensor housing. In some examples, the side vent may positioned on a side wall of the sensor housing closer to a base portion of the sensor housing than the top portion.

In some instances, the main vent may be positioned on a base portion of the sensor housing. In some examples, the side vent may be positioned on a side wall of the sensor housing closer to a top portion of the sensor housing than the bottom portion.

In some instances, the system may further comprise one or more guide blades fixed relative to the sensor housing, wherein the one or more guide blades are configured to force the air pulled into the interior portion of the sensor housing radially outward from the axis. In some examples, the motor may be configured to rotate the one or more guide blades to force the air pulled into the interior portion of the sensor housing radially outward from the axis.

In some instances, the system may further comprise one or more contoured blades fixed relative to the sensor housing, wherein the one or more contoured blades are configured to force the air pulled into the interior portion of the sensor housing through the side vent. In some examples, the motor may be configured to rotate the one or more contoured blades to force the air pulled into the interior portion of the sensor housing through the side vent.

In some instances, the system may further comprise one or more guide blades and one or more contoured blades. In some examples, the one or more guide blades may be straight and the one or more contoured blades may be curved.

In some instances, the sensor may be mounted to a vehicle. In some examples, system may further include the vehicle.

Some aspects of the disclosure may be directed to a system for cooling sensor components, the system may comprise: a sensor having a rotatable sensor housing; a motor, wherein the motor is configured to rotate the sensor housing around an axis; a main vent integrated into the sensor housing, wherein the rotation of the sensor housing pulls air into an interior portion of the sensor housing through the main vent; and a spoiler edge attached to the sensor housing, wherein the spoiler edge extends radially outward from the sensor housing and includes an exhaust vent.

In some instances, the air pulled into the interior portion of the sensor housing may be exhausted out of the sensor housing through the exhaust vent.

In some instances, the system may further comprise an interior channel within the sensor housing connected to the exhaust vent. In some examples, the air pulled into the interior portion of the sensor housing may flow through the interior channel to the exhaust vent.

In some instances, the system may further comprise one or more guide blades, wherein the one or more guide blades are configured to force the air pulled into the interior portion of the sensor housing radially outward from the axis.

In some instances, the system may further comprise one or more contoured blades, wherein the one or more contoured blades are configured to force the air pulled into the interior portion of the sensor housing through the interior channel and out of the exhaust vent.

In some instances, the system may further comprise a vehicle, wherein the sensor is mounted to the vehicle.

BRIEF DESCRIPTION OF THE DRAWINGS

FIG. 5A is an example illustration of guide blades in the interior of a sensor housing having a main vent located on a top portion in accordance with aspects of the disclosure.

FIG. 5B is an example illustration of contoured blades in the interior of a sensor housing having a main vent located on a top portion in accordance with aspects of the disclosure.

FIG. 6A is an example illustration of guide blades in the interior of a sensor housing having a main vent located on a base portion in accordance with aspects of the disclosure.

FIG. 6B is an example illustration of contoured blades in the interior of a sensor housing having a main vent located on a base portion in accordance with aspects of the disclosure.

DETAILED DESCRIPTION

This technology relates to cooling the interior of a sensor housing, and associated computer components positioned therein, by using convective air flows. In this regard, a sensor may be comprised of internal sensor components, such as sensors and processors, and housing. The housing may protect the internal sensor components and processors from elements, such as rain, snow, dust and other such debris. However, operation of the internal sensors components, processors, and solar energy may result in excessive heat within the housing. Such excessive heat may prematurely degrade the internal sensor components and processors and possibly overheat the processors making them inoperable.

To dissipate the heat within the sensor housing, a convective air flow may be passed through the sensor housing. In this regard, the rotation of the sensor housing may generate a centripetal force which pulls cool air located externally from the sensor into the interior of the sensor housing. The cool, pulled in air may be directed across the sensor's internal components, thereby drawing heat away from the sensor's internal components. The heated air may then be directed out of the sensor housing.

Figure 1:
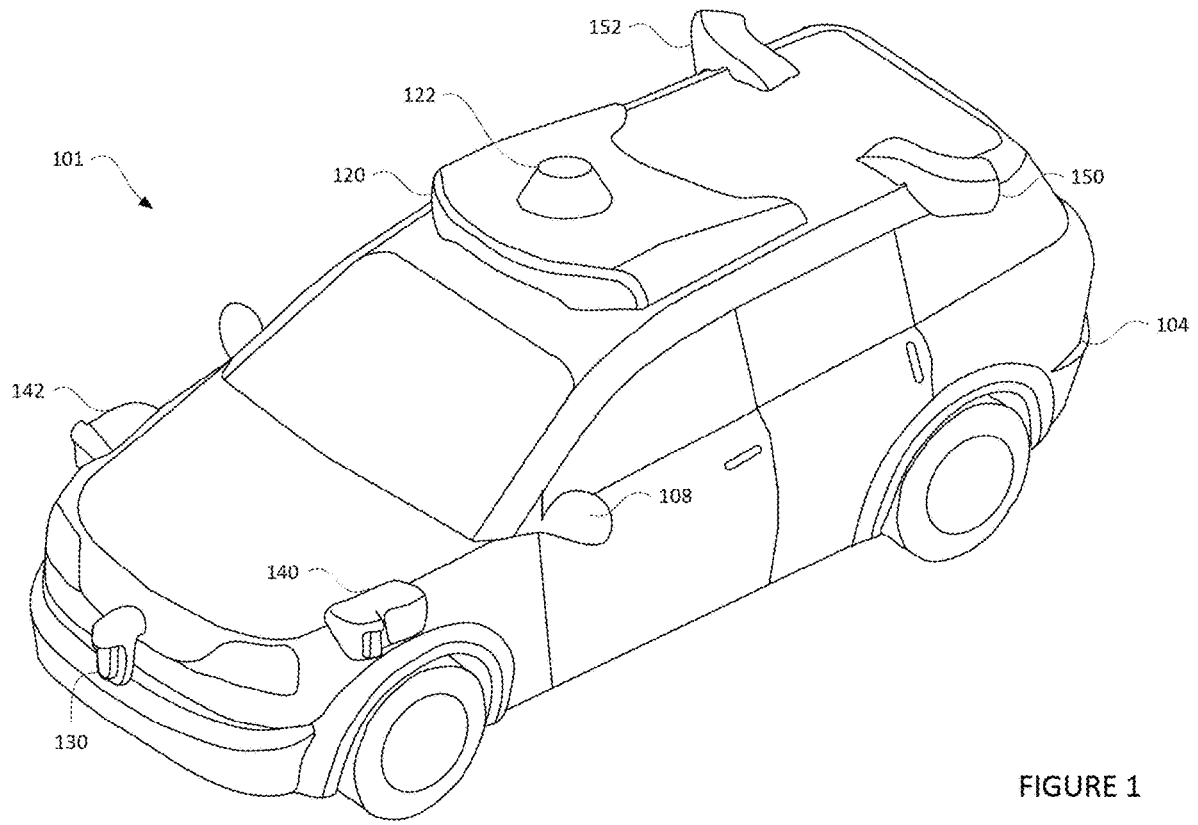
FIG. 1 is an example representative view of a vehicle with sensor housings in accordance with aspects of the disclosure.

A vehicle may have one or more sensors to detect objects external to the vehicle such as other vehicles, obstacles in the roadway, traffic signals, signs, trees, etc. For example, the vehicle 101, as shown in FIG. 1, may include lasers, sonar, radar, cameras and/or any other detection devices that capture images and record data which may be processed by computing devices within the vehicle. The vehicle's sensors, such as LIDAR, radar, cameras, sonar, or other such imaging sensors, may capture images and detect objects and their characteristics such as location, orientation, size, shape, type, direction and speed of movement, etc. Images may include the raw (i.e., unprocessed) data captured by the sensors and/or pictures and videos captured by camera sensors. Images may also include processed raw data. For instance, the raw data from the sensors and/or the aforementioned characteristics can be quantified or arranged into a descriptive function or vector for processing by the computing devices. The images may be analyzed to determine the vehicle's location, and to detect and respond to objects when needed.

The sensors may be arranged around the vehicle's exterior or interior. For example, housings 130, 140, 142, 150, 152 may include, for example, one or more LIDAR devices. The sensors may also be incorporated into the typical vehicle components, such as tail lights/turn signal lights 104 and/or side view mirrors 108. In some instances one or more laser, radar, sonar, camera and/or other such imaging sensors may be mounted on the roof, such as in housing 122, attached to mount 120.

Figure 2:
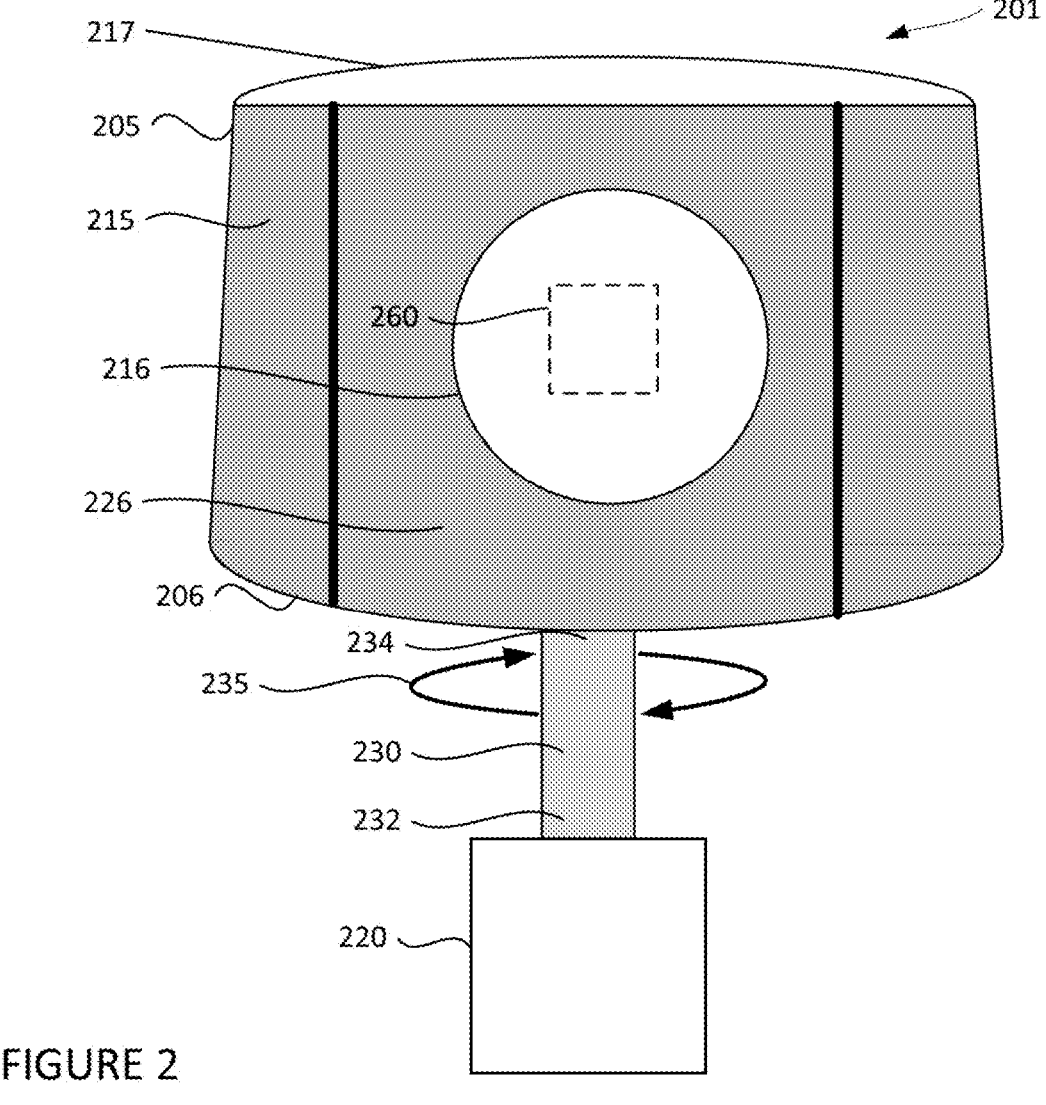
FIG. 2 is an example external view of a sensor housing with internal sensor components in accordance with aspects of the disclosure.

A vehicle sensor may be comprised of internal sensor components and a housing for housing the internal sensor components. For instance, the housing 215, which may be compared to housings 122, 130, 140, 142, 150, and 152, may be configured such that it has a domed shaped top portion 217 with a side wall 205, such that the housing is in the shape of a frustum, as shown in FIG. 2. Although the sensor housing is shown in the shape of a frustum, the sensor housing may be configured in various shapes and sizes, such as spheres, cylinders, cuboids, cones, prisms, pyramids, cubes, etc., or any combination of such shapes. The sensor housing 215 may be comprised of materials such as plastic, glass, polycarbonate, polystyrene, acrylic, polyester, etc.

The sensor housing may include a housing window constructed at a certain location on the sensor housing such that the internal sensor components may transmit and receive one or more signals through the housing window. For instance, the side wall 205 of the sensor housing 215 may include a flat portion 226 in which housing window 216 is incorporated to allow signals (not shown) from internal sensor components 260 to penetrate the sensor cover 215, as further shown in FIG. 2. Although, the housing window 216 is shown as being circular in FIG. 2, various other shapes may also be used for the housing window. In addition, the housing window may be incorporated onto non-flat surfaces of the housing.

In some instances the entire sensor housing 215, or a large portion of the sensor housing 215, may be penetrable by the signals transmitted and received by the internal sensor components, thereby allowing a large portion or the entire sensor housing 215 to function as a housing window. Although the housing window 216 is shown as being only a portion of the side wall 205, in some instances the entire side wall 205 may be constructed as a housing window. Further, multiple housing windows may be positioned on the sensor housing 215. The housing window 216 may be composed of the same, or different, material as the sensor housing 215.

The sensor 201 and/or sensor housing 215 may be attached to a motor via a sensor shaft. For instance, as further shown in FIG. 2, the sensor shaft 230 may include a first end 232 and a second end 234. The first end of the of a sensor shaft 232 may be attached to a sensor motor 220 and the second end of the sensor shaft 234 may be connected to the sensor 201 and/or sensor cover 215, such as at the base portion 206 of the sensor cover. In this regard, the first end of the sensor shaft 232 may be attached to the motor 220 via a belt, gear, chain, friction roller, etc. The motor 220 may rotate the sensor shaft 230 in the first direction 235 causing the entire sensor 201 and/or sensor housing 215 to also rotate in the first direction 235.

In some embodiments the sensor shaft 230 may only rotate the sensor housing 215, and not the internal components 260 of the sensor. The sensor 201, sensor housing 215, and/or motor 220 may each be located internally or externally from a vehicle. Although FIG. 2 shows the sensor 201 being attached to the motor 220 via a shaft 230, the motor 220 may be integrated or otherwise directly connected to the sensor 201 and/or sensor housing 215.

The sensor housing may include a main vent through which air may flow into the interior of the sensor housing. The main vent may be positioned in a location where a pressure differential between the air located externally from the sensor housing and the air within the interior of the sensor housing occurs, such as on or near the axis of rotation of the sensor housing. The pressure differential may be formed by the centripetal force generated by the rotation of the sensor housing lowering the pressure within the sensor housing relative to the air outside of the sensor housing. In this regard, the centripetal force increases the pressure the further outwards the air flows. Accordingly, a low pressure is generated near the axis of rotation and a high pressure is generated towards the perimeter where the side vents, described herein, are located. In some instances a sensor housing may include two or more main vents. The pressure differential may cause air to flow through the main vent into the lower pressure interior of the sensor housing.

Figure 3:
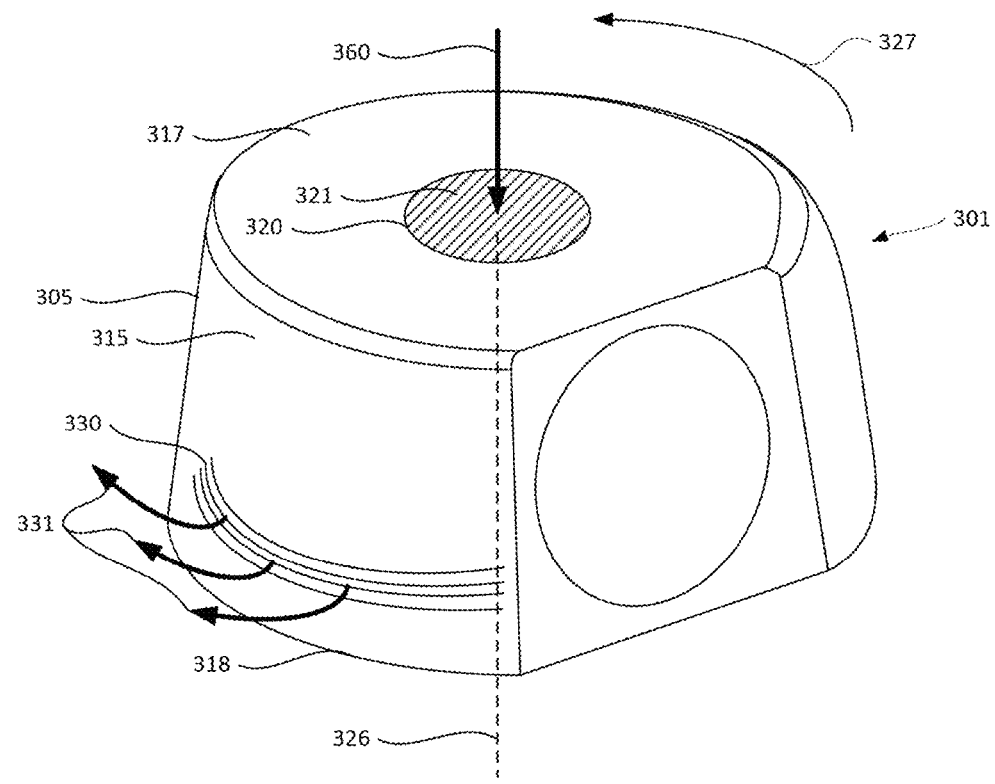
FIG. 3 is an example illustration of airflow through a sensor having a main vent located on a top portion in accordance with aspects of the disclosure.

For example, sensor 301 shown in FIG. 3 and which may be compared to sensor 201, includes a main vent 320 positioned on the sensor housing 315 at the center of the top portion 317. As further illustrated in FIG. 3, the main vent 320 is positioned on the axis of rotation, illustrated by line 326, of sensor 301 as it moves in a first direction, illustrated by arrow 327. Air may pass from the higher pressure location outside of the sensor housing 315, through the main vent 320, to the lower pressure locations in the interior of the sensor housing caused by the rotation of the sensor housing 315, as illustrated by arrow 360.

Figure 4:
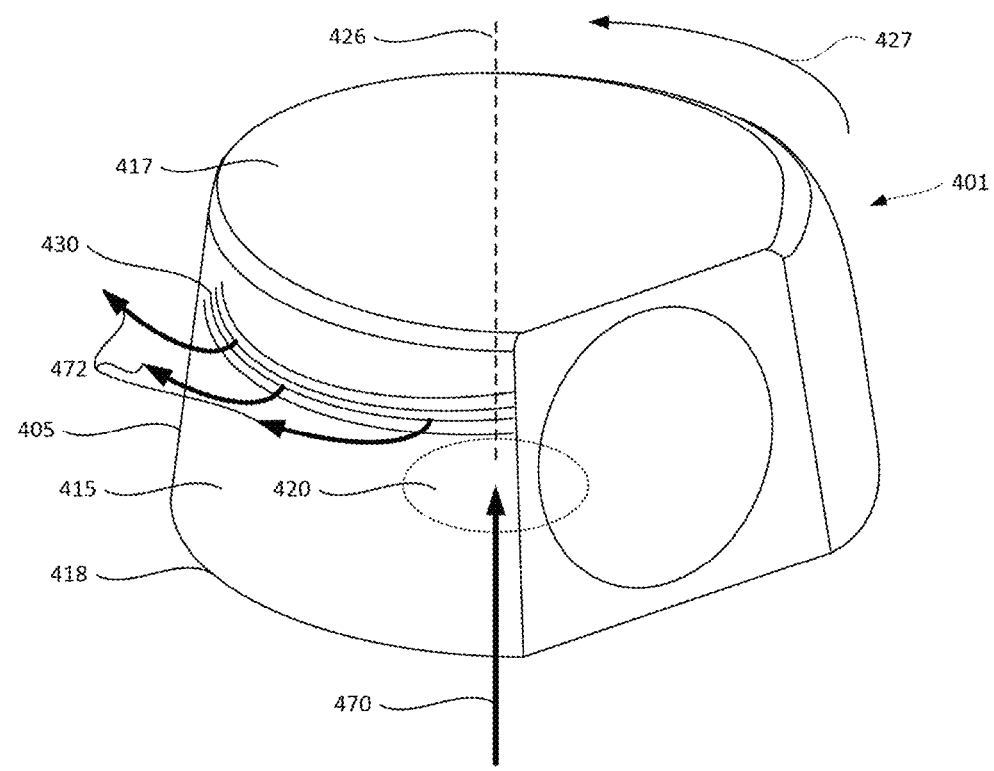
FIG. 4 is an example illustration of airflow through a sensor housing having a main vent located on a base portion in accordance with aspects of the disclosure.

In another example, sensor 401 shown in FIG. 4 and which may be compared to sensors 201 and/or 301, includes a main vent 420 positioned on the sensor housing 415 in the center of the base portion 418. As further illustrated in FIG. 4, the main vent 420 is positioned on the axis of rotation, illustrated by line 426, of sensor 401 as it moves in a first direction, illustrated by arrow 427. Although sensor 301 shows the main vent 320 as being centered on the top portion 317 and sensor 401 shows the main vent being centered on the base portion 418, the main vent may be offset from the axis of rotation. Air may pass from the higher pressure location outside of the sensor housing 415, through the main vent 420, to lower pressure locations in the interior of the sensor housing caused by the rotation of the sensor housing 415, as illustrated by arrow 470.

The main vent may include a permeable cover which allows air to pass into the interior of the sensor housing while at the same time blocking particles and debris from entering into the interior of the sensor housing. In some instances, a filter may be positioned in or near the main vent to filter out particles and debris from the cool air which is pulled into the interior of the sensor housing. For example, main vent 320 of sensor 301 includes a filter cover 321 to block particles and debris from traveling through the main vent 320.

Side vents may be positioned on the sensor housing to vent air to the exterior of the sensor housing. The side vents may be one or more openings in the sensor housing which are configured to allow air to flow from high pressure locations within the interior of the sensor housing to lower pressure locations outside of the sensor housing. The side vents may include one or more covers, louvers, and/or filters which may prevent particles from passing through the sensor housing.

The side vents may be positioned at a location on the sensor housing where air vented out of the sensor housing is directed away from the sensor housing's main vent to avoid recirculating air through the sensor housing. For instance, the side vents may be positioned at a location that vents the air in a radial direction relative to the main vent. For example, and as shown in FIG. 3, side vents 330 are positioned on the side wall 305 near the base portion 318 of the sensor housing 315 when the main vent 320 is on the top portion 317 of the sensor 301. Air from within the sensor housing 315 may be output through the side vents 330 in a direction radial direction relative to the main vent 320, as illustrated by arrows 327.

In another example, and as shown in FIG. 4, side vents 430 may be positioned on the side wall 405 near the top portion 417 when the main vent 420 is on the base portion 418 of the sensor 401. Air from within the sensor housing may be output through the side vents 430 in a direction radial direction relative to the main vent 420, as illustrated by arrows 472.

Guide blades may be positioned and mounted, or otherwise integrated, into the interior of the sensor housing. In this regard, the guide blades may be positioned around the axis of rotation of the sensor to move air away from the main vent to other portions of the interior of the sensor housing. The guide blades may remain fixed relative to the housing. In this regard, the rotation of the guide blades and the sensor housing may be at same rate and/or the guide blades may be permanently attached to the sensor housing. For example, and as shown in the cut-away top view of sensor 301 in FIG. 5A, the guide blades 511 may be positioned around the axis of rotation 326. In the cut-away bottom view of sensor 401 shown in FIG. 6A, the guide blades may be positioned around the axis of rotation 426. For clarity purposes, only a single guide blade in each sensor (i.e., sensor 301 and 401) is labeled in FIGS. 5A and 6A.

The guide blades may be positioned anywhere within the sensor housing. However, the further radially outward the guide blades are positioned from the axis of rotation the more effective they may be at moving air away from the axis of rotation. In this regard, as the sensor housing rotates, the guide blades may also rotate forcing the air within the sensor housing to move in a radial direction away from the axis of rotation towards the side wall of the sensor. For example, and as illustrated in FIG. 5A, guide blades 511 may force air within sensor housing 315 radially outward as illustrated by arrows 512. Similarly, guide blades 611 may force air within sensor housing 415 radially outward as illustrated by arrows 612. The change in pressure the guide blades produce may increase the further outwards from the axis of rotation they extend. As such, the further the guide blades are positioned from the axis of rotation, the greater the change in pressure the guide blades may produce. Although the guide blades (e.g., 511 and 611) are illustrated as being straight, the guide blades may have contours, such as curves.

Contoured blades may be positioned and mounted, or otherwise integrated, into the interior of the sensor housing to force warmed air out of the sensor housing. In this regard, one or more contoured blades may be mounted near the side vents to force warm air from within the sensor housing to a location outside of the sensor housing. For example, and as shown in the cut-away bottom view of sensor 301 in FIG. 5B, the contoured blades 521 may be positioned around the axis of rotation 326. Similarly, and as shown in the cut-away top view of sensor 401 in FIG. 6B, the contoured blades 621 may be positioned around the axis of rotation 426. For clarity purposes, only a single contoured blade in each sensor (i.e., sensor 301 and 401) is labeled in FIGS. 5B and 6B. Although the contoured blades (e.g., 521 and 621) are illustrated as being straight, the guide blades may have contours, such as curves.

The rotation of the sensor housing may also rotate the guide blades and contoured blades to generate an airflow through the sensor housing. In this regard, the rotation of the sensor housing may generate a centripetal force which pulls cool air located externally from the sensor into the interior of the sensor housing. The cool, pulled in air may be forced across the sensor's internal components by the rotation of the guide blades. Through convection, the air travelling past the internal sensor components may draw heat away from the internal components. The heated air may then be directed out of the sensor housing by the rotation of the contoured blades.

Figure 5C:
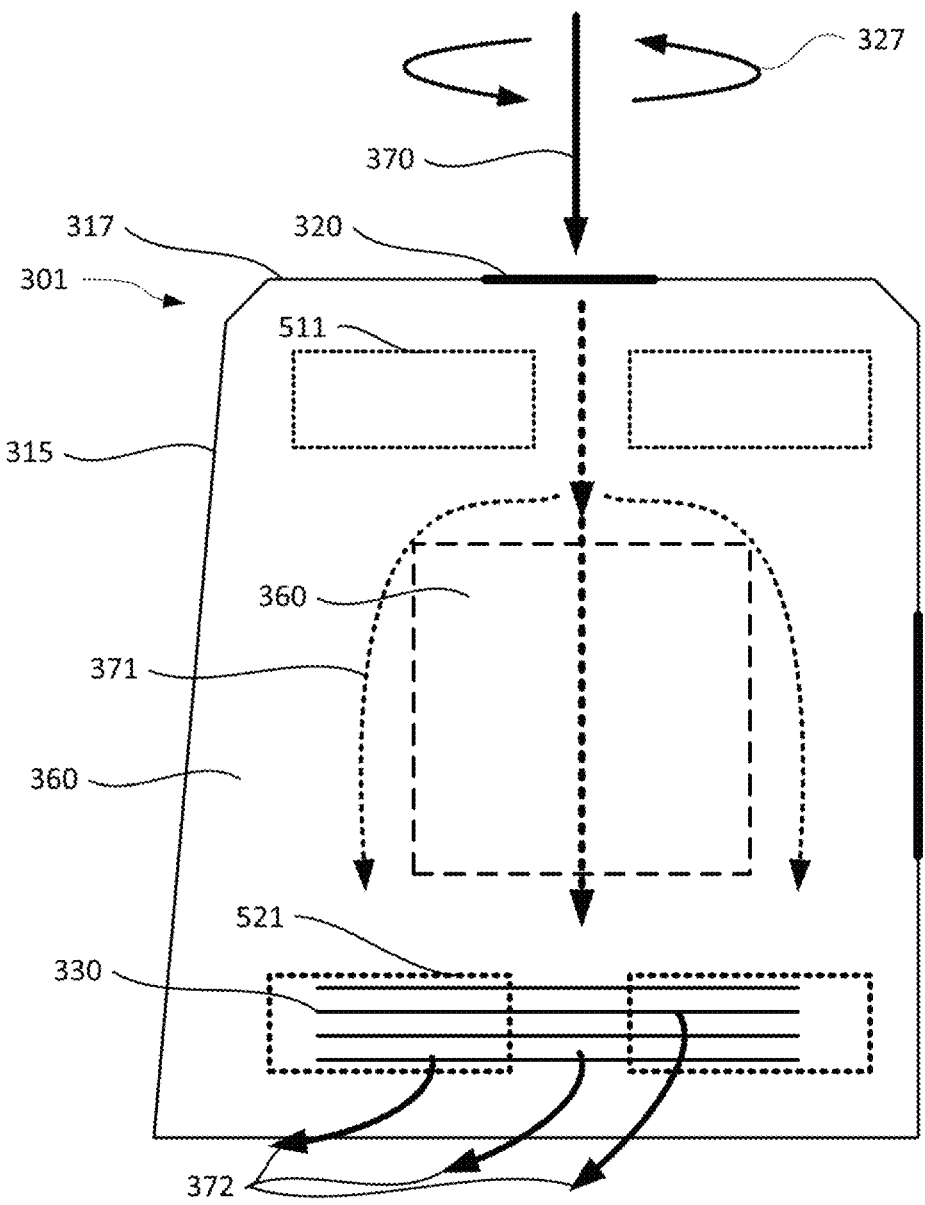
FIG. 5C is an example illustration of airflow through the interior of a sensor housing having a main vent located on a top portion in accordance with aspects of the disclosure.

For example, FIG. 5C illustrates airflow through sensor 301 which includes a main vent 320 located on the top portion 317 of the sensor housing 315. As the sensor housing 315 rotates in the first direction 327, a centripetal force is generated which may pull cool air downward and through the main vent 320, as illustrated by arrow 370. The rotation of the guide blades 511 may force the cool air across the internal sensor components 360, as illustrated by arrows 371. The cool air passing across the internal sensor components 360 may draw heat away from the internal sensor components 360. The rotation of the contoured blades 521 may then force the warmed air out of the sensor housing 315 through the side vents 330.

Figure 6C:
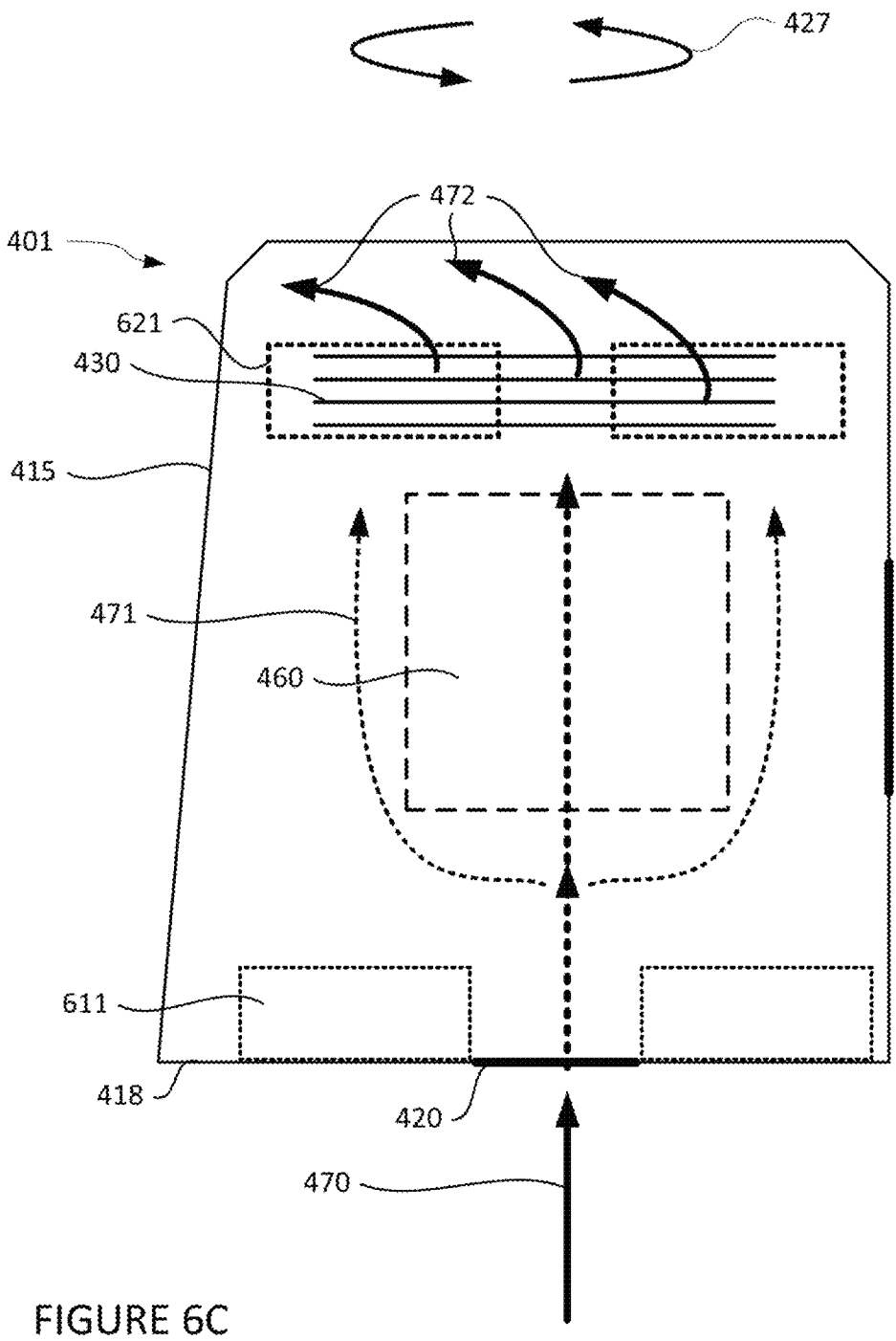
FIG. 6C is an example illustration of airflow through the interior of a sensor housing having a main vent located on a base portion in accordance with aspects of the disclosure.

FIG. 6C illustrates airflow through sensor 401 which includes a main vent 420 located on the base portion 418 of the sensor housing 315. As the sensor housing 415 rotates in the first direction 427, a centripetal force is generated which may pull cool air in and upwards through the main vent 420, as illustrated by arrow 470. The rotation of the guide blades 611 may force the cool air across the internal sensor components 460, as illustrated by arrows 471. The cool air passing across the internal sensor components 460 may draw heat away from the internal sensor components 360. The rotation of the contoured blades 621 may then force the warmed air out of the sensor housing 415 through the side vents 430.

The path of the air within the sensor housing may be controlled as the air flows through the sensor housing. In this regard, the sensor housing may include one or more channels through which the flow may travel. As such, the flow of air may be controlled, such that it can be directed to certain locations within the sensor housing, such as past internal sensor components which may require cooling.

Figure 7:
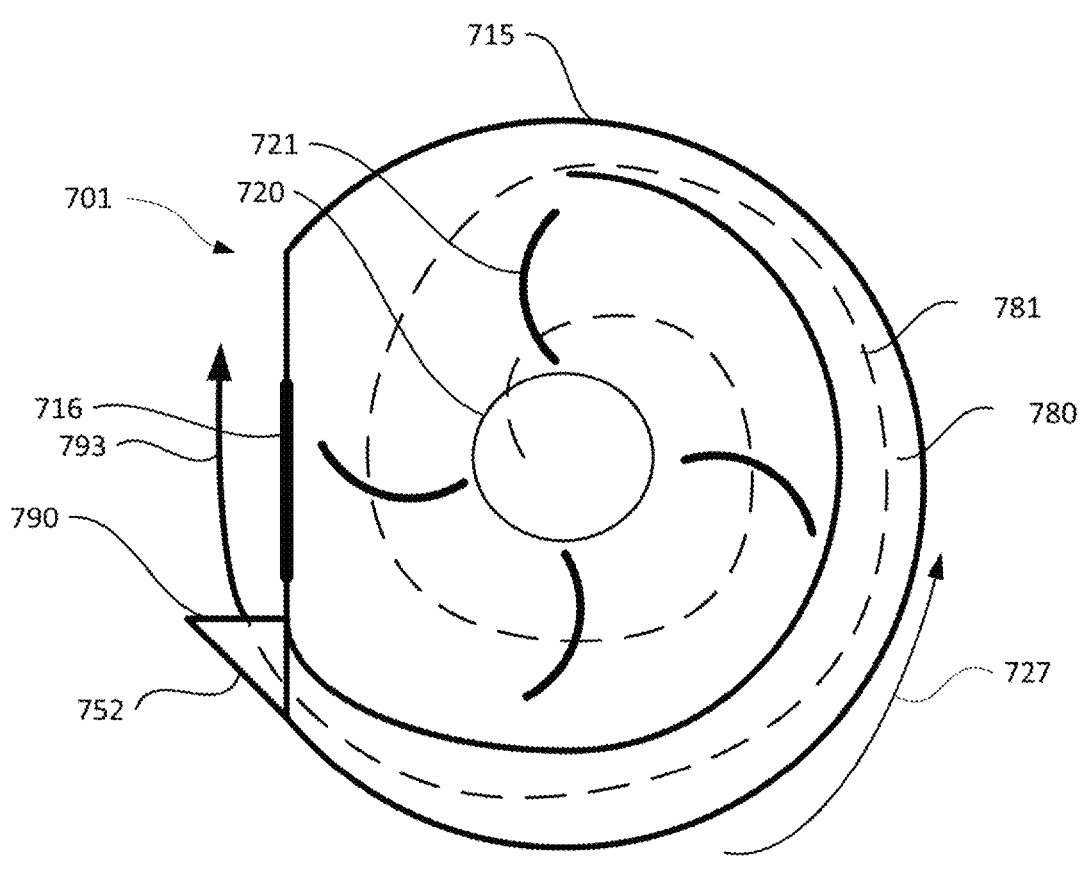
FIG. 7 is an example illustration of airflow through a channel in the interior of a sensor housing in accordance with aspects of the disclosure.

For instance, and as illustrated in the cut-away top view of sensor 701 in FIG. 7, sensor 701, which may be compared to sensors 201, 301, and 401, may include a main vent 720 on the top portion (not shown to allow the interior of the sensor housing to be shown) of sensor housing 715. Within the interior of the sensor 701 may be a channel 780 which provides a controlled path through which air may flow. The rotation of the sensor 701 in the first direction illustrated by arrow 727, along with the rotation of the contoured blades 721 positioned within the sensor housing 715, may force air, illustrated as dashed line 781, into channel 780. The air 781 may flow through the channel 780 and out of the sensor housing at output 790. In some instances, the air may flow through the channel 780 to targeted locations within the sensor housing.

The heated air may be exhausted past the housing window or other portions of the sensor housing to prevent particle buildup. In this regard, the sensor housing and/or housing window may become covered by particles such as water, dust, dirt, condensation, or other such elements and debris, over time. As such, the functions of the internal sensor components may be impeded as signals transmitted and received by the internal sensor components may be blocked by the buildup of particles.

Figure 8:
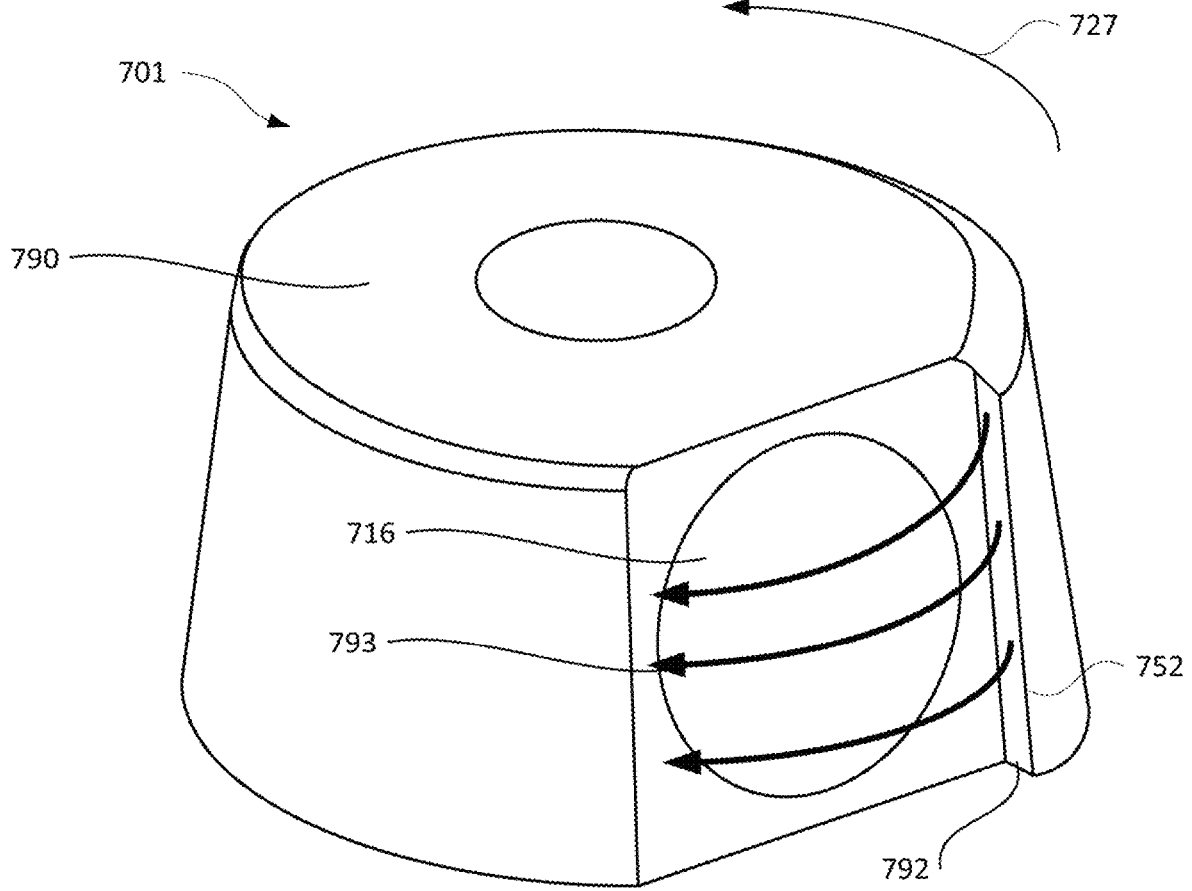
FIG. 8 is an example illustration of airflow output across a housing window in accordance with aspects of the disclosure.

To address this, a spoiler edge having a vent may be incorporated into or attached to the sensor housing. For example, and as illustrated in FIGS. 7 and 8, the spoiler edge 752 may be positioned adjacent to the housing window 716 and configured such that the spoiler edge 752 extends away from the housing window 716 and/or sensor housing 715. As further illustrated in FIGS. 7 and 8, the spoiler edge 752 may be positioned such that the spoiler edge is at a leading position relative to the sensor window during rotation in the first direction 727. The spoiler edge may include a vent 792 through which warmed air from the interior of the sensor can be output. Warmed air output through the vent 792 may be output across the face of the housing window, as illustrated by arrows 793, to prevent the particles from building up on areas of the sensor housing where signals may be transmitted and/or received. Vent 792 may be used in lieu of, or in conjunction with side vents, such as side vents 330. Although FIGS. 7 and 8 illustrate the main vent positioned on the top portion 790 of sensor 701, the main vent may be positioned on the bottom portion of the sensor.

The features described herein may allow for efficient dissipation of heat within a sensor housing. As noted above, a convective airflow may provide cooling for components within the sensor housing. As such, the heat generated by the sensor components in sensor housing, as well as the heat generated by solar radiation may be effectively removed. Moreover, by using guide blades and contoured blades within the sensor housing, air is able to be moved across the surface of the internal sensor components without the need for a fan. As a fan is not required to cool the components, noise and vibration introduced by a fan is avoided. Moreover, by avoiding the need for a fan, fewer mover parts are required to cool the interior of the sensor housing, thereby decreasing the number of potential failure points of the cooling system. Moreover, the guide inlet blades and contoured blades do not require an additional power source.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for cooling sensor components, the system comprising:

a sensor including:

a sensor housing;

a main vent defined on the sensor housing;

a side vent defined on the sensor housing; and one or more guide blades mounted in an interior portion of the sensor housing and near the main vent, wherein the one or more guide blades lie in one or more respective planes that each extend radially outward from an axis; and a motor configured to rotate the sensor housing and the one or more guide blades around the axis, wherein the rotation of the sensor housing pulls air into the interior portion of the sensor housing through the main vent, wherein the rotation of the one or more guide blades moves the air away from the main vent to other portions of the interior of the sensor housing, and wherein the air pulled into the interior portion of the sensor housing is exhausted out of the sensor housing through the side vent.

2. The system of claim 1, wherein the one or more guide blades are fixed relative to the housing.

3. The system of claim 1, wherein the one or more guide blades are configured to force the air pulled into the interior portion of the sensor housing radially outward from the axis.

4. The system of claim 3, wherein the motor is configured to rotate the one or more guide blades in order to force the air pulled into the interior portion of the sensor housing radially outward from the axis.

5. The system of claim 1, wherein the one or more guide blades are straight.

6. The system of claim 1, wherein the motor is configured to rotate the one or more guide blades and the sensor housing at a same rate.

7. The system of claim 1, wherein a change in pressure the one or more guide blades produce is based on a position of the one or more guide blades relative to the axis.

8. The system of claim 1, wherein the main vent is positioned on a top portion of the sensor housing.

9. The system of claim 8, wherein the side vent is positioned on a side wall of the sensor housing closer to a base portion of the sensor housing than the top portion.

10. The system of claim 1, wherein the main vent is positioned on a base portion of the sensor housing.

11. The system of claim 10, wherein the side vent is positioned on a side wall of the sensor housing closer to a top portion of the sensor housing than the base portion.

12. The system of claim 1, further comprising internal sensor components positioned within the sensor housing.

13. The system of claim 1, wherein an effectiveness of one or more guide blades for moving air from the axis is based on a position of the one or more guide blades relative to the axis.

14. The system of claim 1, wherein the sensor housing is in a shape of a frustum.

15. The system of claim 12, wherein the sensor housing includes a housing window.

16. The system of claim 15, wherein the housing window is configured to allow the internal sensor components to transmit and receive signals.

17. The system of claim 1, further comprising a vehicle.

18. The system of claim 17, wherein the sensor is mounted to a roof of the vehicle.

19. The system of claim 1, wherein the sensor housing further comprises a spoiler edge positioned in a leading position relative to the side vent when the sensor housing is rotating.

20. The system of claim 15, wherein the side vent is positioned such that air is exhausted past the housing window in order to prevent particle buildup thereon.

* * * * *